United States Patent [19]
Clanton et al.

[11] Patent Number: 5,734,867
[45] Date of Patent: Mar. 31, 1998

US005734867A

[54] METHOD, DEVICE, MICROPROCESSOR AND MICROPROCESSOR MEMORY FOR INSTANTANEOUS PREEMPTION OF PACKET DATA

[75] Inventors: Christopher Lamonte Clanton, Chicago; Jeffrey Charles Smolinske, Hoffman Estates; Phieu Moc Tran, Lincolnwood, all of Ill.

[73] Assignee: Motorola, Inc., Schaumburg, Ill.

[21] Appl. No.: 508,693

[22] Filed: Jul. 28, 1995

[51] Int. Cl.$^6$ ............... H04M 3/56; H04J 3/16; H04Q 11/04; G06F 13/14
[52] U.S. Cl. .............. 395/500; 370/458; 370/345; 370/461; 455/34.1; 455/12.1
[58] Field of Search ............ 395/500, 860; 370/431, 458, 459, 345, 444, 461, 462, 348; 340/825.03; 455/34.1, 12.1

[56] References Cited

U.S. PATENT DOCUMENTS

| | | | |
|---|---|---|---|
| 4,199,661 | 4/1980 | White et al. | 370/461 |
| 4,319,353 | 3/1982 | Alvarez et al. | 455/13.2 |
| 4,330,857 | 5/1982 | Alvarez et al. | 455/12.1 |
| 4,346,470 | 8/1982 | Alvarez et al. | 370/13.2 |
| 4,507,781 | 3/1985 | Alvarez et al. | 370/345 |
| 5,197,125 | 3/1993 | Engel et al. | 370/458 |
| 5,237,570 | 8/1993 | Smolinske et al. | 370/458 |
| 5,528,585 | 6/1996 | Cooley et al. | 370/461 |
| 5,561,669 | 10/1996 | Lenney et al. | 370/444 |
| 5,570,411 | 10/1996 | Sicher | 455/34.1 |
| 5,598,575 | 1/1997 | Dent et al. | 395/800 |
| 5,636,223 | 6/1997 | Reardon et al. | 370/459 |

Primary Examiner—Kevin J. Teska
Assistant Examiner—Tyrone V. Walker
Attorney, Agent, or Firm—Darleen J. Stockley

[57] ABSTRACT

The present invention provides a method (500), device (400), microprocessor (500) and microprocessor memory (400, 500, 600) for instantaneous preemption of packet-switched data from a user that has won contention for a channel and for transmitting on a time slot, by higher priority traffic type data or voice in a TDMA communication system having a central access manager and a plurality of subscriber units. Before transmitting a packet on an uplink channel, the subscriber unit first selects a time slot and contends for channel access on the time slot. Upon gaining access to the uplink channel, the subscriber unit begins transmitting segments of a data packet on the selected time slot, suspending transmission when a higher priority user gains access to the time slot and, where decoding fails, suspending transmission for the time slot. The subscriber unit continues to transmit on the selected time slot until the packet ends.

12 Claims, 6 Drawing Sheets

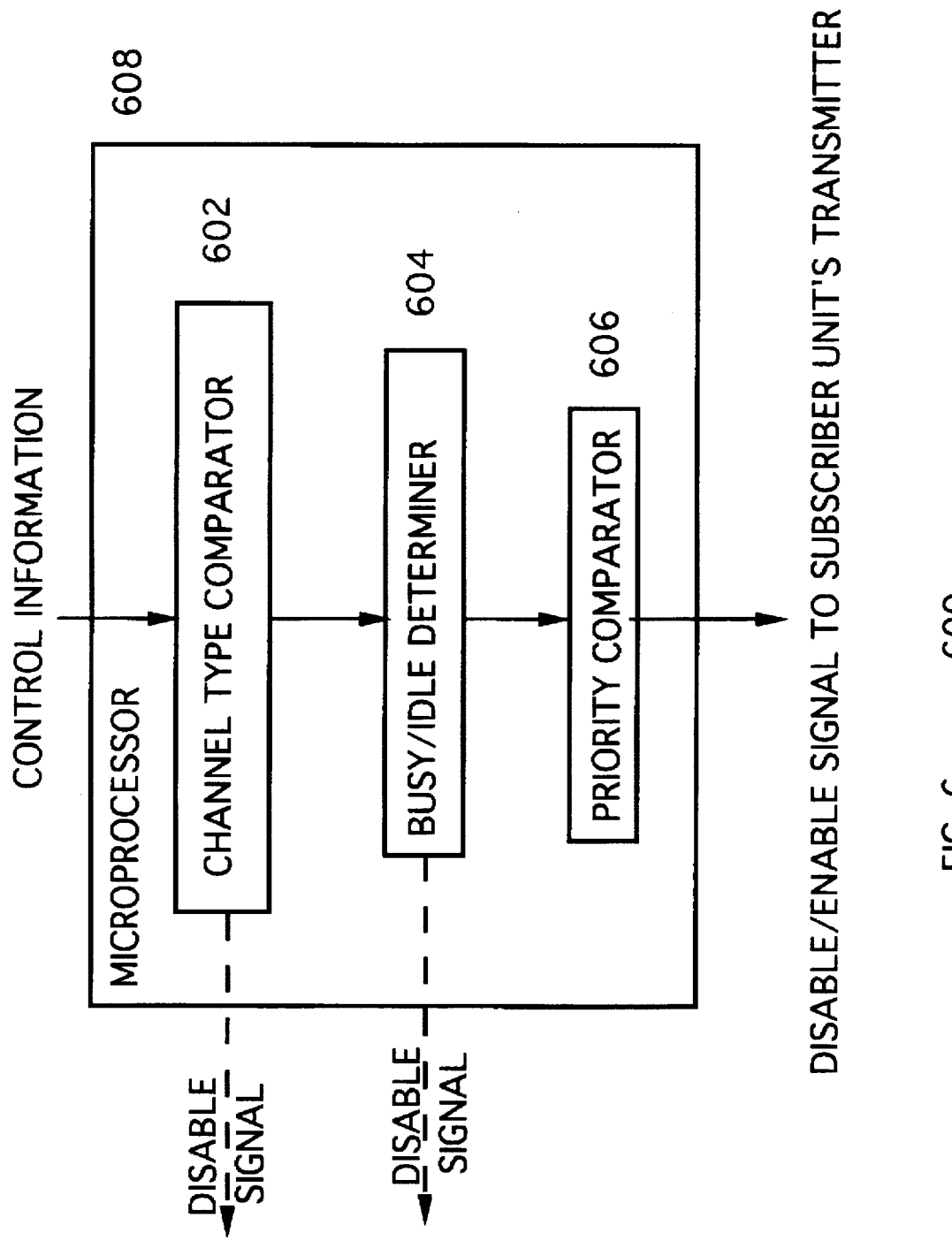
FIG. 6    600

METHOD, DEVICE, MICROPROCESSOR AND MICROPROCESSOR MEMORY FOR INSTANTANEOUS PREEMPTION OF PACKET DATA

FIELD OF THE INVENTION

The present invention relates generally to access control in a communication system, and more particularly, to packet data preemption in a packet communication system.

BACKGROUND OF THE INVENTION

In time-division multiple access (TDMA) packet-switched communication systems, data from many different subscriber units is typically divided into units called packets and transmitted over a common channel. Each packet may be divided to form segments. Each segment occupies a discrete time slot of T seconds within a frame. A frame is made up of n time slots, where n is a positive integer. Thus, subscriber units can communicate with a central access manager on a basis of non-overlapping transmission bursts. Since there is no overlap, a same pair of frequencies, one for uplink and one for downlink, may be assigned to all subscriber units using a same central access manager. Each time slot on the uplink typically consists of a guard time, a small control field called the slow channel (SC), and a user data field called the fast channel. Each time slot on the downlink typically consists of a synchronization field, the slow channel, and the fast channel.

In a TDMA communication system which supports circuit-switched traffic and various types of packet-switched traffic, for example, user data packets and packets used for acknowledgment purposes, there is a need for an efficient method to allow circuit-switched users to send short messages without requiring a dedicated control channel, and packet-switched users to send high-priority short packets instantaneously without going through a contention process.

BRIEF DESCRIPTION OF THE DRAWINGS

FIG. 6 is a block diagram of one embodiment of a microprocessor for providing, in accordance with the present invention, instantaneous preemption of packet-switched data from a subscriber unit that has won contention for a channel and for transmitting on a time slot, by higher priority traffic type data or voice in a TDMA communication system having a central access manager and a plurality of subscriber units.

DETAILED OF A PREFERRED EMBODIMENT

The present invention provides a method for instantaneous preemption of packet-switched data from a subscriber unit that has won contention for a channel and for transmitting on a time slot, by higher priority traffic type data in a TDMA communication system having a central access manager and a plurality of subscriber units. Before a subscriber unit may transmit a packet on an uplink channel, the subscriber unit must first select a time slot and contend for channel access on the selected time slot. Upon successfully gaining access to the uplink channel, the subscriber unit begins to transmit segments of a data packet on the selected time slot, checking the channel state of the time slot before each transmission, and suspending transmission whenever the subscriber unit fails to decode the downlink or the channel state indicates that a user with a higher priority has ownership of the time slot. When the channel state indicates that the subscriber unit again has ownership of the time slot, the subscriber unit continues to transmit on the time slot until the packet ends.

Figure 1:
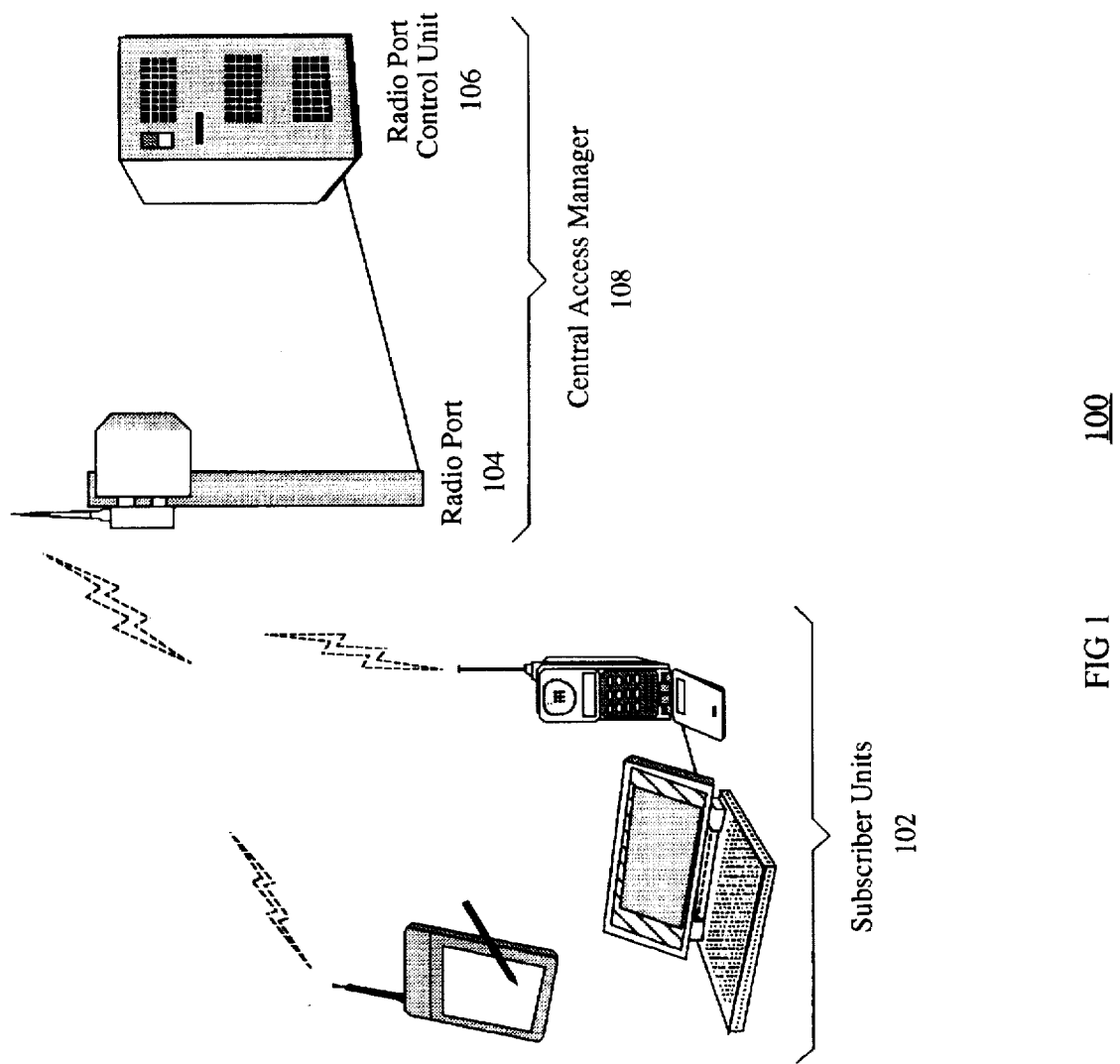
FIG. 1 depicts a communications system with architecture consisting of subscriber units communicating over the air to a radio port that has wireline access via a radio port control unit.

FIG. 1, numeral 100, depicts a communications system with architecture consisting of subscriber units (102) communicating over the air to a radio port (104) that has wireline access via a radio port control unit (106). The radio port and the radio port control unit will be jointly referred to as the central access manager (CAM) (108) in this document. The subscriber unit may be a self-contained device capable of communicating directly over the air to a CAM, or it may consist of a simple data terminal paired with a second device that provides indirect communication with the CAM. The transmission path from the subscriber units to the CAM is called the uplink and the path from the CAM to the subscriber units is called the downlink. Using the time-division multiple access (TDMA) transmission technique, a single uplink/downlink channel pair can provide service to a plurality of subscriber units.

Figure 2:
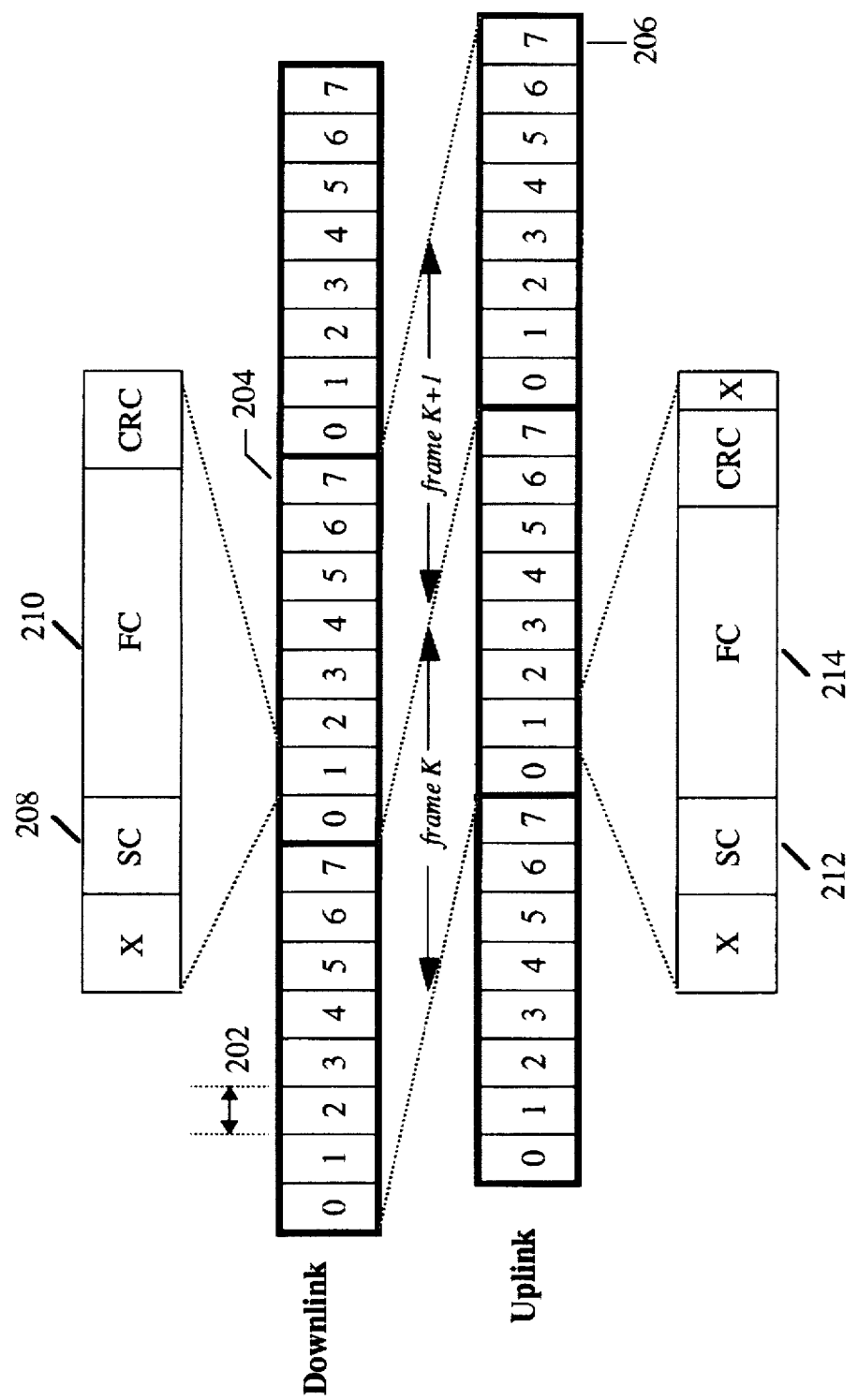
FIG. 2 is a schematic showing an exemplary frame, slot, and slow channel structure for a TDM A system in accordance with the present invention.

FIG. 2, numeral 200, is a schematic showing an exemplary frame, slot, and slow channel structure for a TDMA system in accordance with the present invention. The TDMA technique is characterized by the duration of the time frame and the duration of each time slot (202) within the time frame. These factors generally depend on the system. In the figure shown, both uplink and downlink channels consist of frames containing eight time slots each. The time slots are numbered from 0 to 7. Uplink and downlink frames are skewed such that a downlink frame, number K, occurs a fixed amount of time (approximately nine time slots) before the uplink frame of the same number occurs. The uplink time slot (206) that occurs approximately nine slots after a given downlink time slot (204) is referred to as that downlink time slot's corresponding uplink time slot. Similarly, the downlink time slot that occurs approximately nine time slots before a given uplink time slot will be referred to as that uplink time slot's corresponding downlink time slot. A slow channel (SC)(208, 212) is a portion of a time slot that contains control information. A fast channel (FC) (210, 214) is a larger portion of a time slot that carries mostly user data. The slow channel bit on a downlink time slot (204) indicates the channel state of its corresponding uplink time slot (206). The channel state includes a channel type and the priority level of the time slot.

Figure 3:
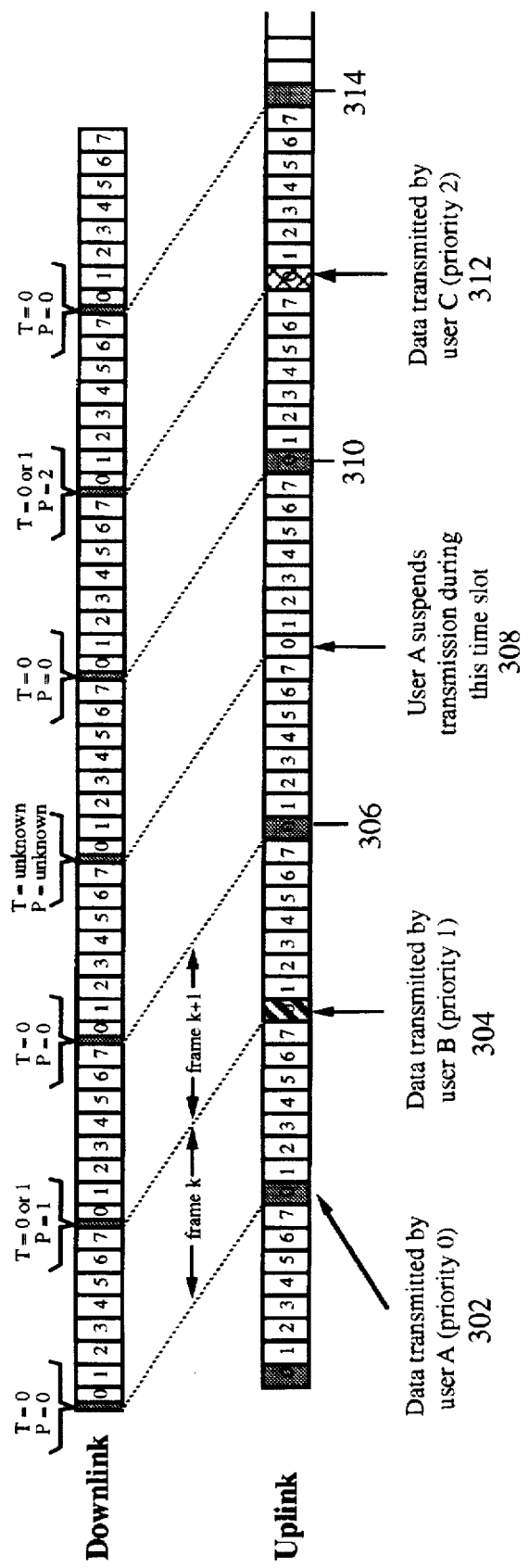
FIG. 3 shows a schematic representation of an uplink packet wherein packet-switched data is momentarily preempted by higher priority traffic type data in accordance with the present invention.

FIG. 3, numeral 300, shows a schematic representation of an uplink packet wherein packet-switched data is momentarily preempted by higher priority traffic type data in accordance with the present invention. Subscriber unit A, who has contended for and won access to the channel of time slot 0, decodes the downlink and reads the slow channel of time slot 0 in each TDMA frame before transmitting on the corresponding uplink time slot of the same numbered frame. Upon successfully reading the downlink slow channel, subscriber unit A determines whether the channel state indicates that subscriber unit A maintains ownership of the time slot. Where the channel state indicates that subscriber unit A maintains ownership of the time slot, e.g., T=0 and P=0, subscriber unit A transmits a segment of a data packet (302). Where the channel state indicates that the current time slot is reserved for higher priority traffic, a higher priority subscriber unit, e.g., subscriber unit B with priority P=1, transmits data (304). Then subscriber unit A, upon determining that the channel state indicates that subscriber unit A has ownership of the time slot, transmits a new segment of the data packet (306). Upon unsuccessfully decoding the downlink time slot, subscriber unit A suspends transmission for the duration of that time slot (308). This prevents subscriber unit A's data from colliding with other data if the time slot happens to be reserved for another subscriber unit. Then, upon determining that the channel state indicates that subscriber unit A has ownership of the time slot, subscriber unit A continues to transmit (310) a segment of the packet on the time slot until determining that a higher priority subscriber unit has ownership of the time slot. Then the higher priority subscriber unit, e.g., subscriber unit C with priority P=2, transmits on the time slot (312). For example, subscriber units B and C may be higher priority packet-switched subscriber units (T=0 and P>0) which have received data from the central access manager via the downlink fast channel and need to transmit an acknowledgment to the central access manager or may be higher priority circuit-switched subscriber units (T=1 and P≧0) who need to send control messages to the central access manager. Where ownership of the time slot is again granted to subscriber unit A, subscriber unit A may then continue to transmit on the time slot (314).

Figure 4:
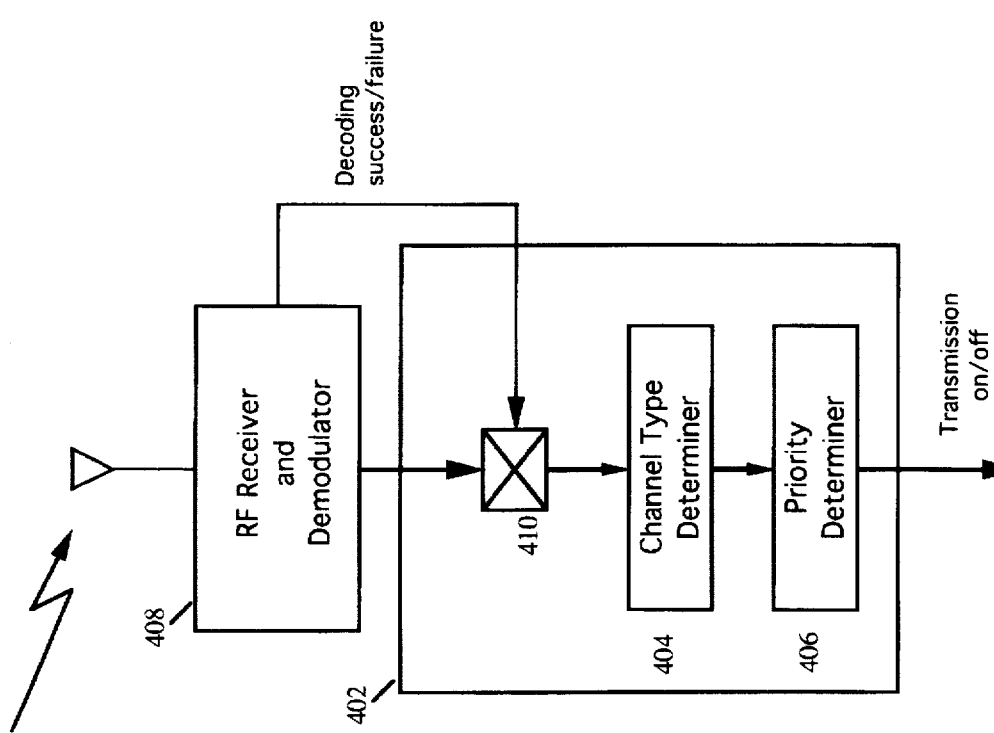
FIG. 4 is a block diagram of a device for providing instantaneous preemption of packet-switched data by a subscriber unit in accordance with the present invention in a TDMA communication system.

FIG. 4, numeral 400, is a block diagram of a device for providing, in accordance with the present invention, instantaneous preemption of packet-switched data from a subscriber unit that has won contention for transmitting on a time slot, by higher priority traffic type data in a TDMA communication system having a central access manager and a plurality of subscriber units. The device (402) is typically coupled to a radio frequency receiver and demodulator (408) of a TDMA communication system to receive control information and includes: A) a logic gate (410), for passing control information (slow channel) to the channel type determiner if the decoding of the downlink time slot data is successful; B) a channel type determiner (404), operably coupled to the logic gate, for utilizing the control information for a time slot for determining a channel type of the time slot; C) a priority determiner (406), operably coupled to the channel type determiner, for one of: C1) allowing the subscriber unit to transmit upon the subscriber unit's determining that the channel state indicates that the subscriber unit maintains ownership of the time slot, and C2) allowing a higher priority subscriber unit to transmit upon the central access manage's assigning the time slot to the higher priority subscriber unit, wherein, where the channel state is undecoded by the subscriber unit, the subscriber unit fails to transmit data.

The channel state generally includes a channel type indication for indicating packet or circuit-switched data and a priority status for indicating a present priority level for a time slot. In general, for a packet channel type, a busy-idle state is determined.

The device may be a microprocessor or, alternatively, the method of the invention may be embodied in computer software, embodied in a memory of a microprocessor, being a computer program loaded in the microprocessor for providing instantaneous preemption of packet-switched data by a subscriber unit that has won contention for a channel and for transmitting on a time slot, by higher priority traffic type data in a TDMA communication system having a central access manager and a plurality of subscriber units.

Figure 5:
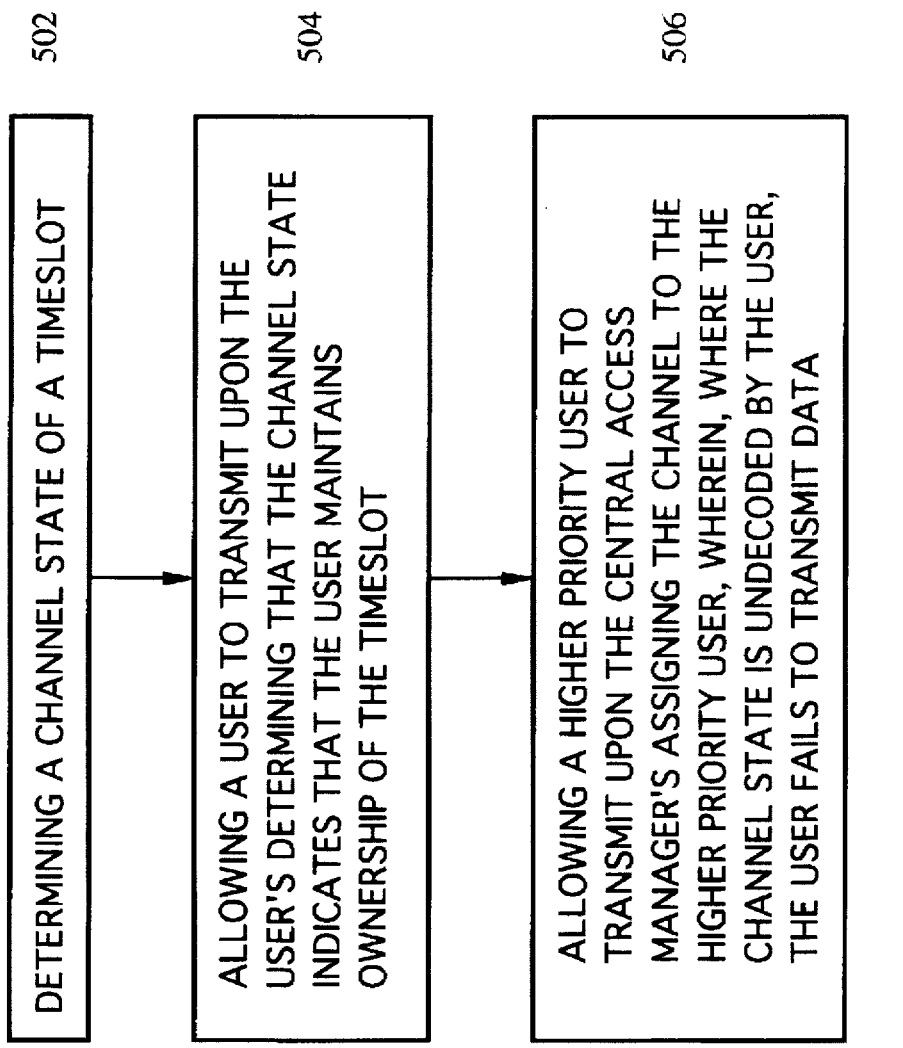
FIG. 5 shows a flow chart of one embodiment of steps of the method of the present invention that provides instantaneous preemption of packet-switched data from a subscriber unit that has won contention for a channel and for transmitting on a time slot, by higher priority traffic type data in a TDMA communication system having a central access manager and a plurality of subscriber units.

FIG. 5, numeral 500, shows a flow chart of one embodiment of steps of the method of the present invention that provides instantaneous preemption of packet-switched data by a subscriber unit that has won contention for a channel and for transmitting on a time slot, by higher priority traffic type data in a TDMA communication system having a central access manager and a plurality of subscriber units. The method comprises the steps of: A) determining, for each TDMA frame, a channel state of the time slot (502); B) allowing the subscriber unit to transmit upon the subscriber unit's determining that the channel state indicates that the subscriber unit maintains ownership of the time slot (504); and C) allowing a higher priority subscriber unit to transmit upon the central access manager's assigning the time slot to the higher priority subscriber unit, wherein, where a state of the channel is undecoded by the subscriber unit, the subscriber unit fails to transmit data (506).

Typically, the channel state includes: A) channel type indication, for indicating one of: packet and circuit-switched data; and B) a priority status for indicating a present priority level for a time slot. For a packet channel type, a busy-idle state is generally determined.

FIG. 6, numeral 600, is a block diagram of one embodiment of a microprocessor for providing, in accordance with the present invention, instantaneous preemption of packet-switched data from a subscriber unit that has won contention for a channel and for transmitting on a time slot, by higher priority traffic type data or voice in a TDMA communication system having a central access manager and a plurality of subscriber units. The microprocessor (608) includes a channel type comparator (602), a busy/idle determiner (604), and a priority comparator. The channel type comparator (602) receives control information from a slow channel of the current time slot and is used to determine the channel type of the time slot, either packet or non-packet. Where the channel type is non-packet, the microprocessor sends a signal to disable the subscriber unit's transmitter for the duration of the current time slot. Where the channel type is packet, the microprocessor enables the busy/idle determiner (604).

The busy/idle determiner (604) is operably coupled to the channel type comparator (602), and is used to determine whether the time slot remains busy. Where the time slot is idle, the microprocessor sends a signal to disable the subscriber unit's transmitter for the duration of the current time slot. Where the time slot remains busy, the microprocessor enables the priority comparator (606).

The priority comparator is operably coupled to the busy/idle determiner (604), and is used to compare the priority of the subscriber unit to the priority which was read from the slow channel. Where the priority of the subscriber unit is less than the priority that was read from the slow channel, the microprocessor sends a signal to disable the subscriber unit's transmitter for the duration of the current time slot.

Where the priority of the subscriber unit is greater than or equal to the priority which was read from the slow channel, the microprocessor enables the subscriber unit's transmitter.

The present invention provides reliable and instantaneous preemption of packets by a higher priority subscriber unit. Before transmitting on each time slot, the subscriber unit must both decode the state of the selected time slot and must determine whether transmission is allowed. If decoding is unsuccessful or if transmission is prohibited, the subscriber unit suspends transmission for the duration of that time slot.

Thus, the present invention requires that a current subscriber unit receive verification that transmission is allowed for a selected time slot prior to each transmission. Where a CAM determines that a higher priority user requires use of a time slot selected by the current packet-switched subscriber unit, the CAM may change the state of the time slot. Then the current packet-switched subscriber unit immediately has access to the change of state information and terminates the transmission on the time slot. Thus, even where the current packet-switched subscriber unit experiences channel failure, the current packet-switched subscriber unit fails to receive access and thus does not transmit, allowing the higher priority user to begin transmitting in spite of the failure.

In general, the invention allows a CAM to insert higher priority traffic even before a current packet has been fully transmitted. That is, a preemption may take place at any time slot boundary, rather than at a packet boundary. This is accomplished by the CAM's changing the state of the time slot for the duration of the higher priority packet, then returning the time slot state to the previous state. The present invention may be implemented in automatic repeat request schemes by assigning retransmission packets to a different priority than regular data packets.

We claim:

1. A microprocessor for providing instantaneous preemption of packet-switched data from a subscriber unit that has won contention for a channel and for transmitting on a time slot, by higher priority traffic type data/voice in a TDMA communication system having a central access manager and a plurality of subscriber units, comprising:
   A) a channel type comparator, for receiving control information from a slow channel of the current time slot and for determining a channel type of the time slot, either packet or non-packet, wherein, where the channel type is non-packet, the microprocessor sends a signal to disable the subscriber unit's transmitter for the duration of the current time slot, and where the channel type is packet, the microprocessor enables a busy/idle determiner;
   b) a busy/idle determiner, operably coupled to the channel type comparator, for determining whether the time slot remains busy, wherein, where the time slot is idle, the microprocessor sends a signal to disable the subscriber unit's transmitter for the duration of the current time slot, and where the time slot remains busy, the microprocessor enables a priority comparator;
   c) a priority comparator, operably coupled to the busy/idle determiner, for comparing the priority of the subscriber unit with the priority which was read from the slow channel, wherein, where the priority of the subscriber unit is less than the priority that was read from the slow channel, the microprocessor sends a signal to disable the subscriber unit's transmitter for the duration of the current time slot, and where the priority of the subscriber unit is greater than or equal to the priority which was read from the slow channel, the microprocessor enable the subscriber unit's transmitter.

2. The microprocessor of claim 1 wherein the state of the channel includes:
   A) channel type indication, for indicating one of: packet and circuit-switched data; and
   B) a priority status for indicating a present priority level for a time slot.

3. The microprocessor of claim 1 wherein for a packet channel type, a busy-idle state is determined.

4. A device for providing instantaneous preemption of packet-switched data from a subscriber unit that has won contention for a channel and for transmitting on a time slot, by higher priority traffic type data/voice in a TDMA communication system having a central access manager and a plurality of subscriber units, comprising:
   A) a channel type comparator, for receiving control information from a slow channel of the current time slot and for determining a channel type of the time slot, either packet or non-packet, wherein, where the channel type is non-packet, sending a signal to disable the subscriber unit's transmitter for the duration of the current time slot, and where the channel type is packet, enabling a busy/idle determiner;
   B) a busy/idle determiner, operably coupled to the channel type comparator, for determining whether the time slot remains busy, wherein, where the time slot is idle, sending a signal to disable the subscriber unit's transmitter for the duration of the current time slot, and where the time slot remains busy, enabling a priority comparator;
   C) a priority comparator, operably coupled to the busy/idle determiner, for comparing the priority of the subscriber unit with the priority which was read from the slow channel, wherein, where the priority of the subscriber unit is less than the priority that was read from the slow channel, sending a signal to disable the subscriber unit's transmitter for the duration of the current time slot, and where the priority of the subscriber unit is greater than or equal to the priority which was read from the slow channel, enabling the subscriber unit's transmitter.

5. The device of claim 4 wherein the state of the channel includes:
   A) channel type indication, for indicating one of: packet and circuit-switched data; and
   B) a priority status for indicating a present priority level for a time slot.

6. The device of claim 4 wherein for a packet channel type, a busy-idle state is determined.

7. Computer software, embodied in a memory of a microprocessor, for providing instantaneous preemption of packet-switched data from a subscriber unit that has won contention for a channel and for transmitting on a time slot, by higher priority traffic type data/voice in a TDMA communication system having a central access manager and a plurality of subscriber units, the computer program having steps comprising:
   A) receiving control information from a slow channel of the current time slot and determining a channel type of the time slot, either packet or non-packet, wherein, where the channel type is non-packet, a signal is sent to disable the subscriber unit's transmitter for the duration of the current time slot, and where the channel type is packet, a busy/idle determiner is enabled;
   B) determining whether the time slot remains busy, wherein, where the time slot is idle, a signal is sent to disable the subscriber unit's transmitter for the duration of the current time slot, and where the time slot remains busy, a priority comparator is enabled;

C) comparing a priority of the subscriber unit with a priority which was read from the slow channel, wherein, where the priority of the subscriber unit is less than the priority that was read from the slow channel, a signal is sent to disable the subscriber unit's transmitter for the duration of the current time slot, and where the priority of the subscriber unit is greater than or equal to the priority which was read from the slow channel, the subscriber unit's transmitter is enabled.

8. The computer software of claim 7 wherein the state of the channel includes:

A) channel type indication, for indicating one of: packet and circuit-switched data; and B) a priority status for indicating a present priority level for a time slot.

9. The computer software of claim 7 wherein for a packet channel type, a busy-idle state is determined.

10. A method for providing instantaneous preemption of packet-switched data from a subscriber unit that has won contention for a channel and for transmitting on a time slot, by higher priority traffic type data or voice in a TDMA communication system having a central access manager and a plurality of subscriber units, comprising the steps of:

A) receiving control information from a slow channel of the current time slot and determining a channel type of the time slot, either packet or non-packet, wherein, where the channel type is non-packet, a signal is sent to disable the subscriber unit's transmitter for the duration of the current time slot, and where the channel type is packet, a busy/idle determiner is enabled;

B) determining whether the time slot remains busy, wherein, where the time slot is idle, a signal is sent to disable the subscriber unit's transmitter for the duration of the current time slot, and where the time slot remains busy, a priority comparator is enabled;

C) comparing a priority of the subscriber unit with a priority which was read from the slow channel, wherein, where the priority of the subscriber unit is less than the priority that was read from the slow channel, a signal is sent to disable the subscriber unit's transmitter for the duration of the current time slot, and where the priority of the subscriber unit is greater than or equal to the priority which was read from the slow channel, the subscriber unit's transmitter is enabled.

11. The method of claim 10 wherein the state of the channel includes:

A) channel type indication, for indicating one of: packet and circuit-switched data; and B) a priority status for indicating a present priority level for a time slot.

12. The method of claim 10 wherein for a packet channel type, a busy-idle state is determined.

* * * * *